(12) United States Patent
Roh et al.

(10) Patent No.: US 9,257,066 B2
(45) Date of Patent: Feb. 9, 2016

(54) METHODS AND DEVICES FOR CONTROLLING OPERATIONS OF AN ORGANIC LIGHT-EMITTING DIODE DISPLAY

(71) Applicant: Samsung Electronics Co., Ltd., Suwon-Si, Gyeonggi-Do (KR)

(72) Inventors: Jong Ho Roh, Yongin-si (KR); Eun Ji Kang, Yongin-si (KR); Kyoung Man Kim, Suwon-si (KR); Jong Hyup Lee, Yongin-si (KR); Kee Moon Chun, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 34 days.

(21) Appl. No.: 14/026,057

(22) Filed: Sep. 13, 2013

(65) Prior Publication Data

US 2014/0078198 A1 Mar. 20, 2014

(30) Foreign Application Priority Data

Sep. 17, 2012 (KR) .................. 10-2012-0103017

(51) Int. Cl.
| | |
|---|---|
| *G09G 3/20* | (2006.01) |
| *G09G 3/32* | (2006.01) |
| *G06F 1/32* | (2006.01) |
| *G09G 1/00* | (2006.01) |

(52) U.S. Cl.
CPC ............ *G09G 3/2003* (2013.01); *G09G 3/3208* (2013.01); *G09G 3/3225* (2013.01); *G06F 1/3259* (2013.01); *G09G 1/005* (2013.01); *G09G 2310/0213* (2013.01); *G09G 2330/021* (2013.01); *G09G 2340/06* (2013.01); *G09G 2360/16* (2013.01)

(58) Field of Classification Search
USPC ............................................ 345/77, 690, 694
See application file for complete search history.

(56) References Cited

U.S. PATENT DOCUMENTS

| | | | |
|---|---|---|---|
| 7,359,573 B2 * | 4/2008 | Park et al. ..................... 382/274 |
| 2003/0090528 A1 * | 5/2003 | Masuda ................ G06F 3/0338 |
| | | | 715/838 |
| 2008/0032754 A1 | 2/2008 | Kim et al. |
| 2010/0026724 A1 | 2/2010 | Goto |
| 2010/0164937 A1 | 7/2010 | Kim |
| 2010/0171751 A1 | 7/2010 | Kim |

(Continued)

FOREIGN PATENT DOCUMENTS

| | | | |
|---|---|---|---|
| JP | 2004012600 A | | 1/2004 |
| JP | 2007212628 A | * | 8/2007 |

(Continued)

*Primary Examiner* — Jason Olson
*Assistant Examiner* — Deeprose Subedi
(74) *Attorney, Agent, or Firm* — Harness, Dickey & Pierce

(57) ABSTRACT

In one example embodiment, a method of operating an image data processing circuit which controls an operation of an organic light-emitting diode (OLED) display includes transforming at least one first RGB value into at least one luminance value and at least one chroma value. The method further includes adjusting the at least one luminance value and the at least one chroma value based on at least one first control value. The method further includes generating at least one second RGB value based on the at least one adjusted luminance value and the at least one adjusted chroma value. The method further includes outputting the second RGB values to the OLED display.

19 Claims, 13 Drawing Sheets

(56) References Cited

U.S. PATENT DOCUMENTS

2011/0205202 A1    8/2011  Son et al.
2011/0249890 A1*  10/2011  Kim et al. .................... 382/162

FOREIGN PATENT DOCUMENTS

| | | |
|---|---|---|
| JP | 2011101296 A | 5/2011 |
| KR | 20100078699 A | 7/2010 |

* cited by examiner

METHODS AND DEVICES FOR CONTROLLING OPERATIONS OF AN ORGANIC LIGHT-EMITTING DIODE DISPLAY

CROSS-REFERENCE TO RELATED APPLICATIONS

This application claims priority under 35 U.S.C. §119(a) from Korean Patent Application No. 10-2012-0103017 filed on Sep. 17, 2012, the disclosure of which is hereby incorporated by reference in its entirety.

BACKGROUND

According to the Helmholtz-Kohlrausch effect, brightness of a display depends on factors such as luminance and chroma. Furthermore, brightness increases as chroma increases at a fixed luminance.

A YCbCr (or YUV) color model is a color model that is commonly used in many digital video systems. Color is represented with ordered triplet components in aYCbCr color space. Y represents a luminance component, Cb represents a blue-difference chroma component, and Cr represents a red-difference chroma component. U and V in YUV represent two chrominance components. YUV and Y'UV are used for color encoding of color information in television (TV) systems and YCbCr is used for encoding of color information suitable for video and still images. Here, Y' represents luma.

Color images are processed in computers. Processed color images are displayed by displays. When the resolution of displays and the brightness of pixels in the displays increase, the power consumption of the displays increases.

SUMMARY

Some example embodiments provide methods and/or devices for controlling the operations of an organic light-emitting diode (OLED) display to reduce power consumption without having an effect on visually perceived brightness.

In one example embodiment, a method of operating an image data processing circuit which controls an operation of an organic light-emitting diode (OLED) display includes transforming at least one first Red, Green, Blue (RGB) value into at least one luminance value and at least one chroma value. The method further includes adjusting the at least one luminance value and the at least one chroma value based on at least one first control value. The method further includes generating at least one second RGB value based on the at least one adjusted luminance value and the at least one adjusted chroma value. The method further includes outputting the at least one second RGB value to the OLED display.

In yet another example embodiment, the method further includes generating the at least one first control value based on at least one input value set by a user.

In yet another example embodiment, the method further includes analyzing a histogram pattern defined by a cumulative distribution of the at least one first RGB value and generating the at least one first control value based on the analyzing.

In yet another example embodiment, the method further includes detecting a type of an application program executed to process the at least one first RGB value and generating the at least one first control value based on the detecting.

In yet another example embodiment, the method further includes generating a plurality of first control values based on position information defining a plurality of display regions in the OLED display, each of the plurality of first control values associated with a respective one of the plurality of display regions. The method further includes independently controlling at least one luminance value and at least one chroma value for each of the plurality of display regions based on the associated one of the plurality of first control values.

In yet another example embodiment, the method further includes adjusting at least one original RGB value based on the at least one second control value and generating the at least one first RGB value based on the at least one adjusted original RGB value.

In yet another example embodiment, the method further includes generating the at least one first control value and the at least one second control value according to input values set by a user.

In yet another example embodiment, the adjusting of the at least one original RGB values includes analyzing a histogram pattern defined by a cumulative distribution of the at least one original RGB value and generating the at least one first control value and the at least one second control value based on the analyzing of the histogram.

In yet another example embodiment, the method further includes detecting a type of an application program executed to process the at least one original RGB value and generating the at least one first control value and the at least one second control value based on the detected type of the application program.

In yet another example embodiment, the method further includes generating a plurality of first control values and a plurality of second control values based on position information defining a plurality of display regions in the OLED display, each of the plurality of first control values and the plurality of second control values associated with a respective one of the plurality of display regions. The method further includes independently controlling at least one luminance value and at least one chroma value for each of the plurality of display regions based on the associated one of the plurality of generated first control values.

In yet another example embodiment, the position information is generated by an application program executed to process the at least one original RGB value.

In one example embodiment, a system on chip (SoC) for controlling an operation of an organic light-emitting diode (OLED) display includes a first conversion circuit configured to transform at least one first Red, Green, Blue (RGB) value into at least one luminance value and at least one chroma value. The SoC further includes an adjustment circuit configured to adjust the at least one luminance value and the at least one chroma value based on at least one first control value. The SoC further includes a second conversion circuit configured to generate at least one second RGB values based on the at least one adjusted luminance value and the at least one adjusted chroma value and output the at least one second RGB value to the OLED display.

In yet another example embodiment, the SoC further includes a register, a user interface configured to receive input values from a user, and a central processing unit (CPU) configured to generate the at least one first control value and the at least one second control value based on the input values and store the at least one first control value and the at least one second control value in the register.

In yet another example embodiment, the SoC further includes a register and a central processing unit (CPU) configured to detect a type of an application program executed to process the at least one original RGB value. The CPU is further configured to generate the at least one first control value and the at least one second control value based on a result of the detected type of the application program, and store the at least one first control value and the at least one second control value in the register.

In yet another example embodiment, the SoC further includes a statistic analyzing circuit configured to analyze a histogram pattern defined by a cumulative distribution of the at least one original RGB value. The SoC further includes a control value generation circuit configured to generate the at least one first control value and the at least one second control value based on the analyzed histogram pattern.

In one example embodiment, method of operating an image data processing circuit which controls an operation of an organic light-emitting diode (OLED) display includes transforming image data into at least one luminance value and at least one chroma value. The method further includes adjusting the at least one luminance value and the at least one chroma value based on at least one first control value. The method further includes generating output image data based on the at least one adjusted luminance value and the at least one adjusted chroma value and outputting the output image data to the OLED display.

In yet another example embodiment, the image data is at least one original Red, Green, Blue (RGB) value associated with data received from an external memory.

In yet another example embodiment, the transforming includes receiving the at least one original RGB value, generating at least one second control value based on at least one input value by a user, and generating at least one first RGB value based on the at least one received original RGB value and the at least one second control value generated.

In yet another example embodiment, the adjusting includes generating the at least one first control value is generated based on at least one of analyzing a histogram pattern defined by a cumulative distribution of the at least one first RGB value, detecting a type of an application program executed to process the at least one first RGB value, and input values set by the user.

In yet another example embodiment, the generating the output image includes converting the at least one adjusted luminance value and the at least one adjusted chroma value into at least one second RGB value.

BRIEF DESCRIPTION OF THE DRAWINGS

Example embodiments will become more apparent by describing in detail example embodiments thereof with reference to the attached drawings in which.

DETAILED DESCRIPTION OF THE EMBODIMENTS

Figure 1:
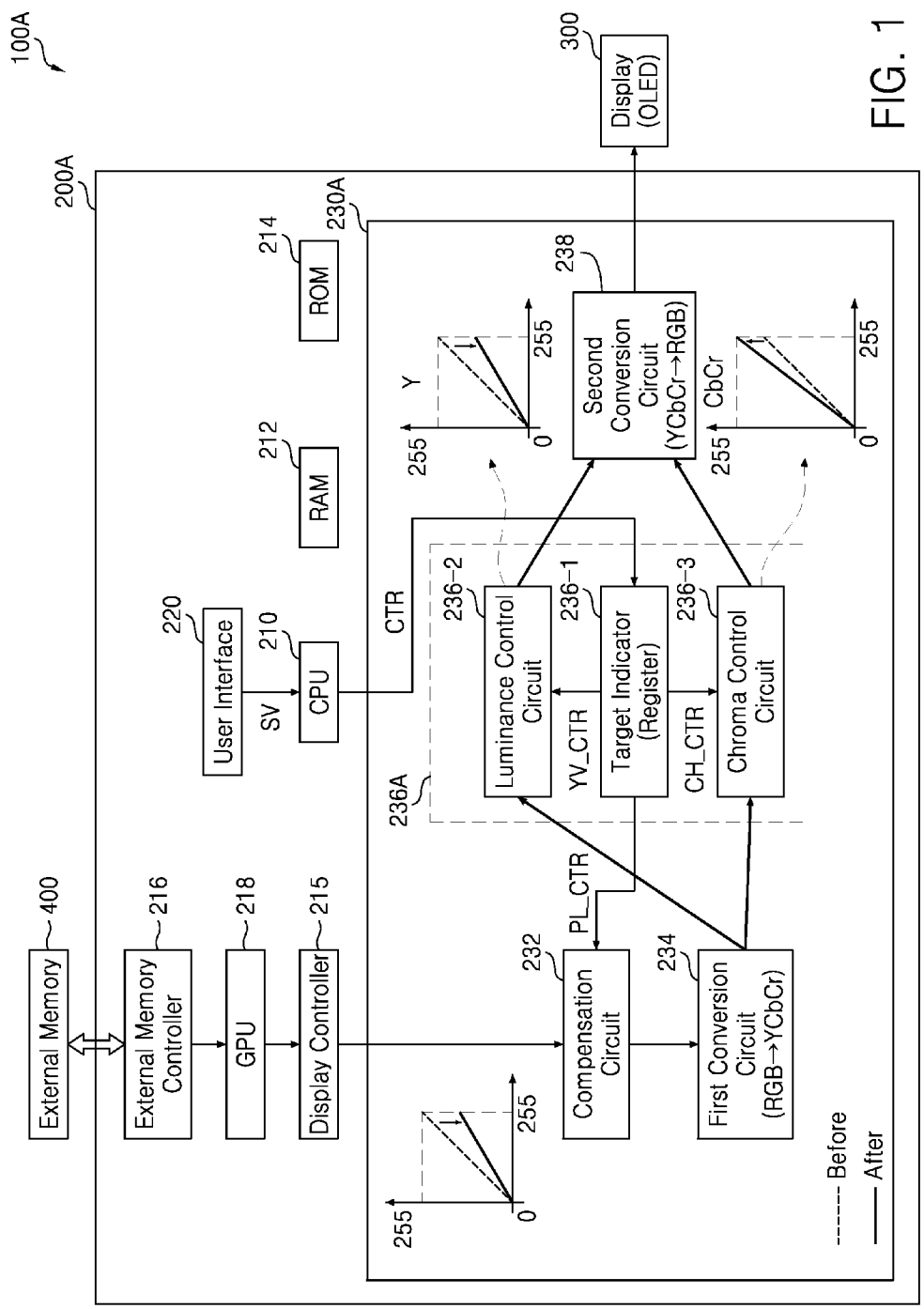
FIG. 1 is a block diagram of an image data display system according to an example embodiment.

Various embodiments will now be described more fully with reference to the accompanying drawings. Like elements on the drawings are labeled by like reference numerals.

Detailed illustrative embodiments are disclosed herein. However, specific structural and functional details disclosed herein are merely representative for purposes of describing example embodiments. This invention may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected,' or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs), computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium" or "computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware, or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

FIG. 1 is a block diagram of an image data display system 100A according to an example embodiment. The image data display system (or image data processing system) 100A includes a processor 200A, a display 300, and an external memory 400.

The image data display system 100A may be any one of, but not limited to, a portable electronic device such as a smart phone, a tablet personal computer (PC), a laptop computer, a portable multimedia player (PMP), an e-book reader, a mobile computer, a personal digital assistant (PDA), a game controller, and a personal navigation assistant (PNA).

As will be described further, with respect to FIG. 2, the processor 200A may transform image data (e.g., original Red, Green, Blue (RGB) values or first RGB values associated with the original RGB values), into luminance values and chroma values to be displayed on the display 300. The processor 200A may further adjust the luminance values and the chroma values (e.g., increase or decrease the luminance and chroma values) based on at least one control value. The processor 200A may further generate second RGB values using the adjusted luminance values and the chroma values. Thereafter, the processor 200A may output the second RGB values to the display 300.

The display 300 displays the image data according to the second RGB values. The display 300 may be any one of, but not limited to, an organic light-emitting diode (OLED) display, an active-matrix OLED (AMOLED) display, an OLED-based flexible display, or an AMOLED-based flexible display.

The External Memory 400 may be any one of, but not limited to, a digital media player such as a DVD player, a Blue-ray Player, a video cassette player. The External Memory 400 may further include a cable box and/or other devices capable of communication with the display 100, including but not limited to, a mobile devices, handheld computers, tablets, etc. Such devices may communicate with the display 300 either wirelessly or through a wired connection.

The processor 200A may be implemented as an application processor or a mobile application processor. The processor 200A may include a central processing unit (CPU) 210, a display controller 215, a user interface 220, and an image data processing circuit 230A. The processor 200A may also include a random access memory (RAM) 212 and a read only memory (ROM) 214. The image data processing circuit 230A may further include a first conversion circuit 234, an adjustment circuit 236A, and a second conversion circuit 238. The processor 200A may further include an external memory controller 216 that controls an access operation, e.g., a read operation or a write operation, with respect to the external memory 400; and a graphics processing unit (GPU) 218 that processes image data output from the external memory controller 216.

The components 210, 212, 214, 215, 216, 218, 220, and 230A of the processor 200A may communicate with one another through at least one bus link (not shown).

The CPU 210 may control the overall operation of the processor 200A. For instance, the CPU 210 may control the operations of at least one of the RAM 212, the ROM 214, the display controller 215, the external memory controller 216, the GPU 218, the user interface 220, and the image data processing circuit 230A.

Figure 2:
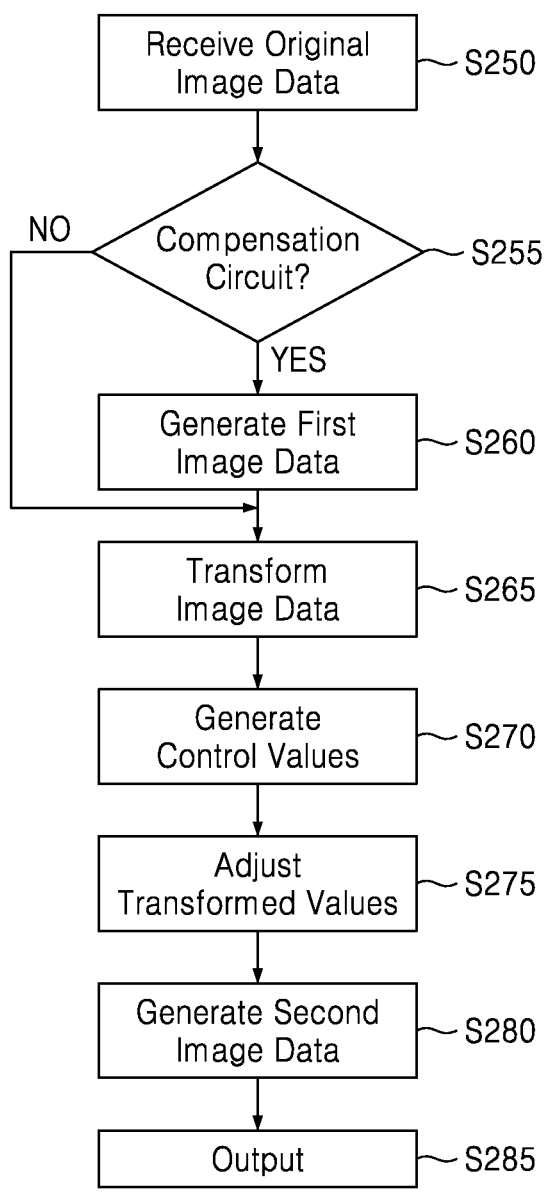
FIG. 2 illustrates a method carried out by the image data display system of FIG. 1, according to an example embodiment.

FIG. 2 illustrates a method carried out by the image data display system of FIG. 1, according to an example embodiment. At S250, the image data processing circuit 230A may receive first image data (e.g., original RGB values or original RGB data) from the display controller 215. For example, the RGB values mean pixel data values. The display controller 215 may in turn receive the original RGB values from the GPU 218. The GPU 218 processes image data input through the external memory controller 216 and transmits the processed image data to the display controller 215.

Users or test engineers of manufacturing companies may input various control values or user input values, which are necessary for the operations of the processor 200A, through the user interface 220. In addition, through the user interface 220, the users or the test engineers may generate a command or an event for executing at least one program loaded to the RAM 212. The at least one program loaded to the ROM 214 may be loaded to the RAM 212 through the bus according to the control of the CPU 210.

At S255, the processing circuit 230A may determine whether the image data processing circuit 230A includes a compensation circuit 232 or not.

If, at S255, it is determined that the image data processing circuit 230A includes a compensation circuit 232, at S260, the image data processing circuit 230A, via the compensation circuit 232, may adjust at least one of the original image data (e.g., original RGB values) based on control values PL_CTR, received from the adjustment circuit 236A and generates first image data (e.g., first RGB values) according to a result of the adjustment. The image data processing circuit 230A may adjust the original RGB values in order to prevent overflow or saturation of chroma values or chrominance values when the chroma values or the chrominance values are increased by the adjustment circuit 236A. The compensation circuit 232 may perform the adjusting by, for example, decreasing the original RGB values in advance.

However, when the image data processing circuit 230A does not include the compensation circuit 232, the original RGB values output from the display controller 215 may be directly input to the first conversion circuit 234.

At S265, the image data processing circuit 230A, via the first conversion circuit 234 transforms the original image data (e.g., RGB values) or the first image data (e.g., first RGB values) into luminance values and chroma values (or chrominance values in some cases). For instance, the first conversion circuit 234 may transform RGB values in an RGB color space into YCbCr values in a YCbCr color space, based on any known technique for conversion. At this time, Y is a luminance component and Cb and Cr are two chroma components. The luminance values are Y values and the chroma values are Cb and Cr values.

In one example embodiment, transforming original RGB values or first RGB values into YCbCr values may be carried out. However, such transformations is not limited to that between RGB and YCbCr values but rather may be carried out between RGB values and any of YUV, Y'CbCr, YDbDr, YIQ and YCoCg values. In general such transformation may be applied to image data processing circuits that decrease luminance values to reduce power consumption of the display 300, e.g., OLED display, and that increase chroma values (or chrominance values in come occasions) to maintain the visually perceived brightness of images displayed on the display 300. Accordingly, in the description, chroma components may encompass concepts including chrominance components and chroma values may encompass concepts including chrominance values.

The image data processing circuit 230A may include an adjustment circuit 236A, which in turn may include a target indicator 236-1, a luminance control circuit 236-2, and a chroma (or occasionally a chrominance) control circuit 236-3. The target indicator 236-1 may be implemented as a register. At S270, the image data processing circuit 230A, via the target indicator 236-1 may generate the luminance control values YV_CTR and the chroma control values CH_CTR based on control values CTR outputted from the CPU 210.

The CPU 210 may generate the control values CTR based on values SV set by users through the user interface 220 or user input values input through the user interface 220. Alternatively, the CPU 210 may generate the control values CTR based on values SV set by manufacturers, e.g., test engineers, through the user interface 220. In this case, users may change the values SV set by the engineers using the user interface 220.

In one example embodiment, the CPU 210 may detect a type of an application program, such as a video playback application program, a still-image playback application program, a game application program, a user interface (UI) application program, or a graphical user interface (GUI) application program, which has been executed by a user or a test engineer to process original RGB values or first RGB values; and may generate the control values CTR based on a result of the detection.

At S275, the image data processing circuit 230A, via the luminance control circuit 236-2 and the Chroma control circuit 236-3 of the adjustment circuit 236A, may adjust luminance values and chroma values based on the control values YV_CTR and CH_CTR received at S270. The image data processing circuit 230A may perform the adjusting at S275 by, for example, decreasing luminance values output from the first conversion circuit 234 based on the luminance control values YV_CTR. The luminance control values YV_CTR may correspond to a power saving ratio indicating how much the power consumption of the display 300 is reduced.

Moreover, the image data processing circuit 230A, via the chroma control circuit 236-3 may perform the adjusting at S275, for example, increasing chroma (or chrominance) values output from the first conversion circuit 234 based on the chroma control values CH_CTR.

At S280. The image data processing circuit 230A, via the second conversion circuit 238 generates second image data (e.g., second RGB values), based on adjusted luminance values and adjusted chroma values. The image data processing circuit 230A may generate the second image data by transforming YCbCr values in the YCbCr color space into RGB values in the RGB color space.

In one example embodiment, transforming adjusted YCbCr values into second RGB values may be carried out according to any well-known technique. In carrying out the transformation, the conversion circuits 234 and 238 may perform any one of, but not limited to, an International Telecommunication Union Radio communication Sector (ITU-R) BT.601 conversion, an ITU-R BT.709 conversion, a Joint Photographic Experts Group (JPEG) conversion, and a conversion according to digital television (TV) broadcasting standards.

At S285, the image data processing circuit 230A outputs the second image data (e.g., second RGB values) to the display 300.

The display 300 may display an image according to the second RGB values.

As compared to the situation according to which an image is displayed on the display 300 based on the original RGB values, when an image is displayed on the display 300 based on the second RGB values the power consumption of the display 300 is reduced due to the decreased luminance values while the perceived brightness of the image displayed on the display 300 is not changed or increased due to the increased chroma values.

Figure 3:
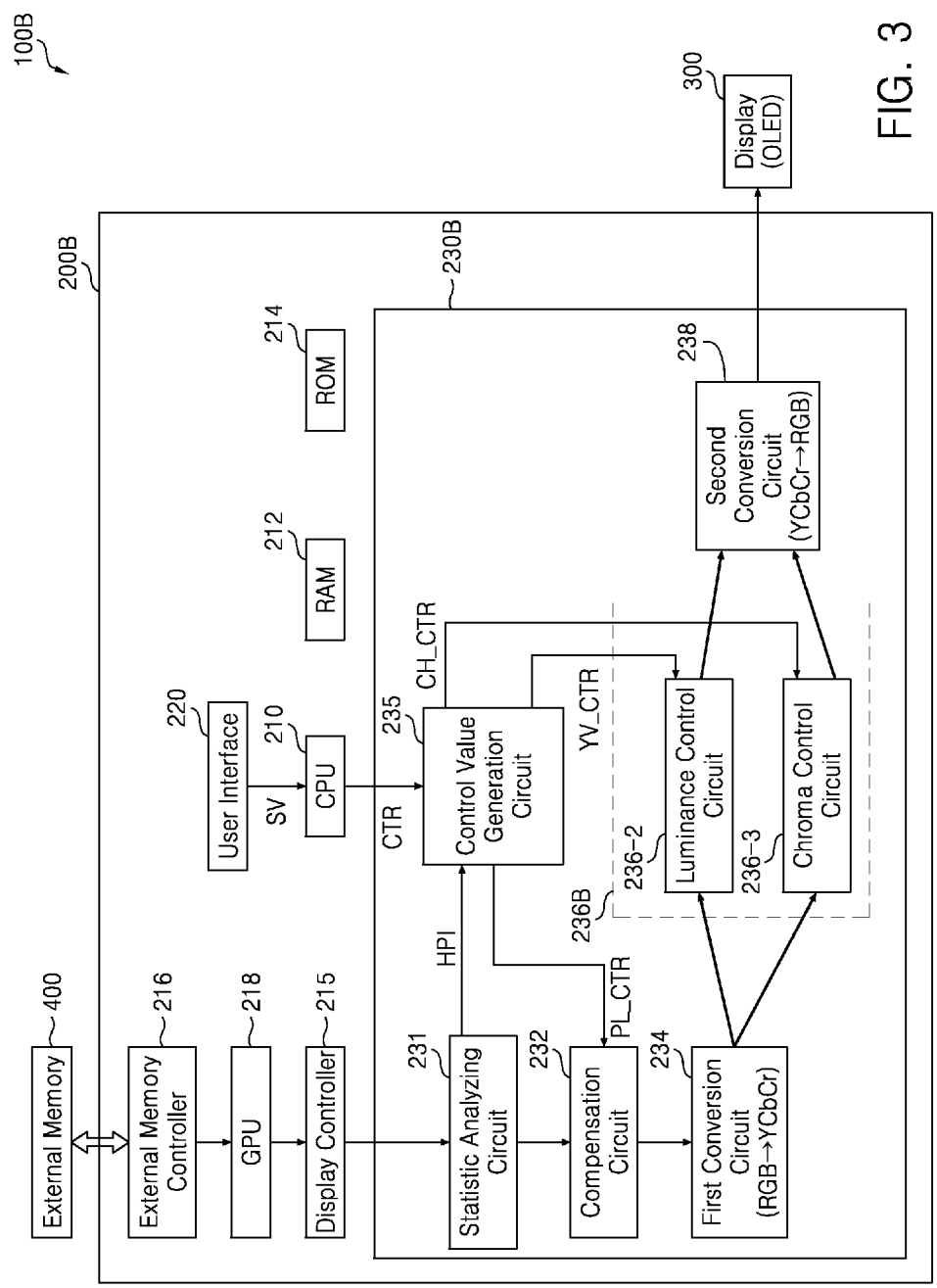
FIG. 3 is a block diagram of an image data display system according to an example embodiment.

FIG. 3 is a block diagram of an image data display system according to an example embodiment. Referring to FIG. 3, the image data display system (or image data processing system) 100B includes a processor 200B, the display 300, and an external memory 400.

The processor 200B may include the CPU 210, the display controller 215, the user interface 220, and an image data processing circuit 230B. As described above, the processor 200B may also include the RAM 212, the ROM 214, the external memory controller 216, and the GPU 218, which function as described above with reference to FIG. 1.

The image data processing circuit 230B includes a statistic analyzing circuit 231, the compensation circuit 232, the first conversion circuit 234, a control value generation circuit 235, an adjustment circuit 236B, and the second conversion circuit 238. The statistic analyzing circuit 231 analyzes a histogram pattern defined by a cumulative distribution of each of the original RGB values output from the display controller 215 and outputs an analysis result HPI to the control value generation circuit 235

FIGS. 4A-D are graphs of histogram patterns of image data input to a statistic analyzing circuit illustrated in FIG. 3, according to an example embodiment. In the graph of a cumulative distribution for a single image processing unit (e.g., a single frame), the X-axis indicates an RGB value, such as brightness or gray scale voltage, and the Y-axis indicates a frequency of a given brightness or gray scale voltage.

As shown in FIGS. 4A-D, the brightness or gray scale voltage may have 256 levels when the RGB values are expressed in 8 bits.

Figure 4A:
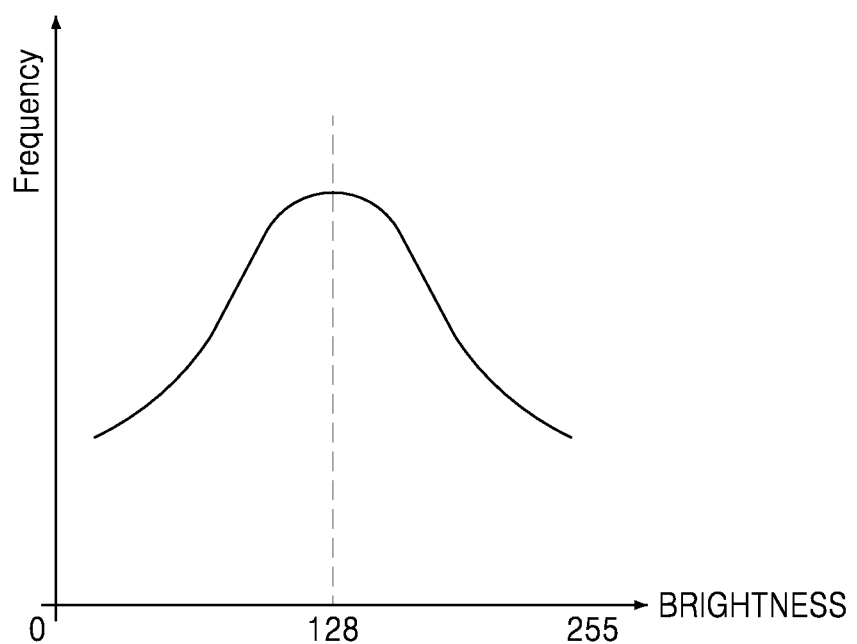
FIGS. 4A-D are graphs of histogram patterns of image data input to a statistic analyzing circuit illustrated in FIG. 3, according to an example embodiment.
Figure 4B:
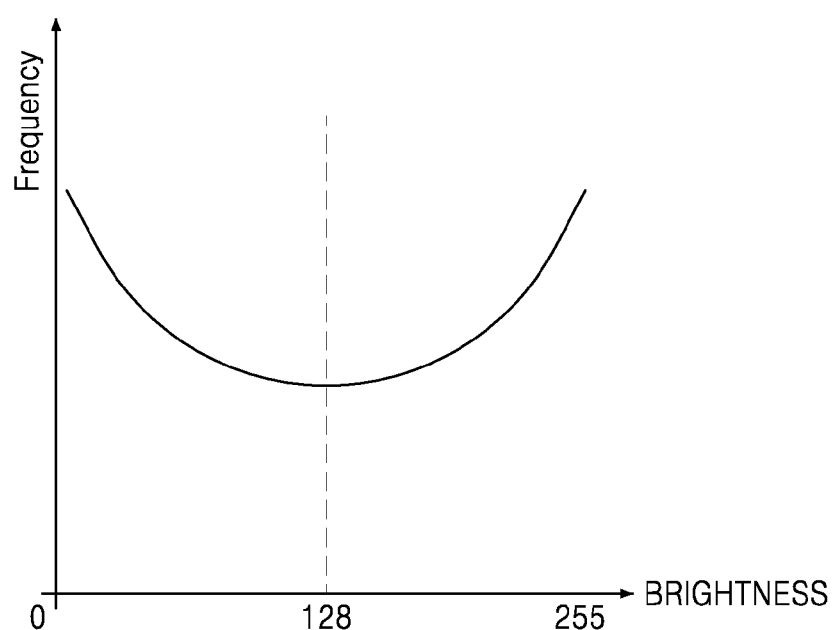
Figure 4C:
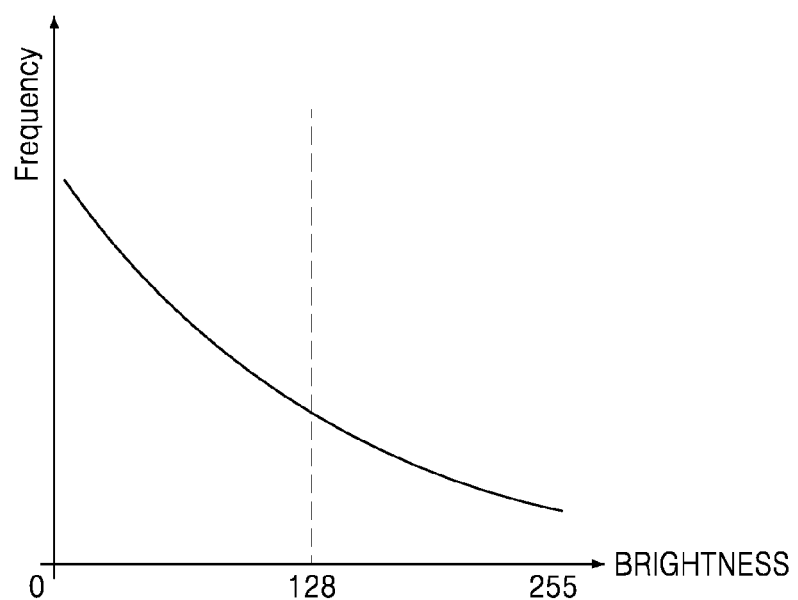
Figure 4D:
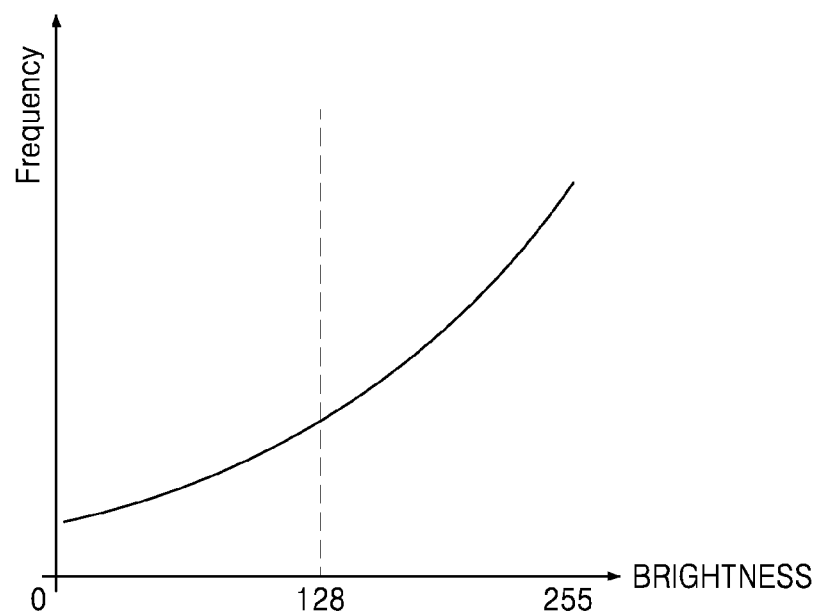

FIG. 4A shows the histogram pattern including the majority of RGB values at a medium level. FIG. 4B shows the histogram pattern including the minority of RGB values at the medium level. FIG. 4C shows the histogram pattern including the majority of RGB values at lower levels. FIG. 4D shows the histogram pattern including the majority of RGB values at higher levels.

Figure 5:
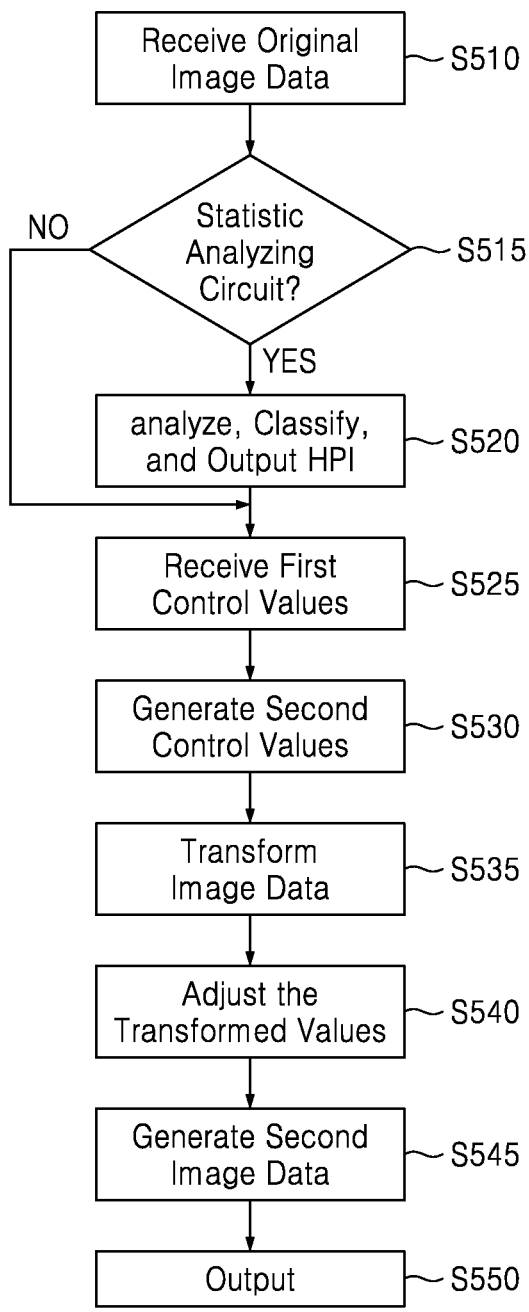
FIG. 5 illustrates a method carried out by the image data display system of FIG. 3, according to an example embodiment.

Hereinafter, the operations of the component depicted in FIG. 3, will be described with reference to FIG. 5. FIG. 5 illustrates a method carried out by the image data display system of FIG. 3, according to an example embodiment. As described above with respect to S250 of FIG. 2, at S510, the image data processing circuit 230B may receive original image data (e.g., RGB values) from the display controller 215. The display controller 215 may in turn receive the original RGB values from the GPU 218.

At S515, the image data processing circuit 230B, determines whether the image data processing circuit 230B includes a statistic analyzing circuit 231 or not. If the image data processing circuit 230B includes the statistic analyzing circuit 231, then at S520, the image data processing circuit 230B may analyze a histogram pattern defined by the cumulative distribution of each of the original image data (e.g., original RGB values), classify the histogram pattern as one of the graphs illustrated in FIGS. 4A-D according to a result of the analysis, and output histogram pattern information (HPI) corresponding to a classification result.

The HPI may be a cumulative value with respect to each of the original RGB values, values corresponding to a one-dimensional graph generated according to the analysis result, or values corresponding to a two-dimensional graph generated according to the analysis result.

If the image data processing circuit 230B does not include the statistic analyzing circuit 231, upon receiving the original image data at S510, the process continues to S525.

At S525, the image data processing circuit 230B may receive control values CTR outputted by the CPU 210. At S530, the image data processing circuit 230B, via the control value generation circuit 235 may generate control values (e.g., YV_CTR, CH_CTR and PL_CTR control values) based on the control values CTR received from the CPU 210. In an alternative embodiment, the image data processing circuit 230B, via the control value generation circuit 235 may generate the YV_CTR, CH_CTR and PL_CTR control values based on the HPI.

In one example embodiment, which of the HPI and the control values CTR may be used in generating the control values YV_CTR, CH_CTR and PL_CTR, may be set by the CPU 210. The setting may be determined by the set values SV output from the user interface 220.

In one example embodiment and as described above, the control values YV_CTR, CH_CTR, and PL_CTR may be generated according to the user, the test engineer of the manufacturing company, the type of an application program, or the histogram pattern information HPI.

At S535, similar to S265 described above with respect to FIG. 2, the image data processing circuit 230B, via the first conversion circuit 234 transforms the first image data or the original image data (e.g., first RGB values or original RGB values) into luminance and chroma values using well-known techniques.

At S540, the image data processing circuit 230B, via the adjustment circuit 236B may adjust the transformed luminance and chroma values. For example, the image data processing circuit 230B, via the luminance control circuit 236-2 may decrease the luminance values output from the first conversion circuit 234 based on the luminance control values YV_CTR. Furthermore, the image data processing circuit 230B, via the chroma control circuit 236-3 increase the chroma values output from the first conversion circuit 234 based on the chroma control values CH_CTR.

At S545, the image data processing circuit 230B, via the second conversion circuit 238 generates second RGB values based on adjusted luminance values and adjusted chroma values based on well-known techniques including the conversion standards described above. At S550, the image data processing circuit 230B may output the second RGB values to the display 300.

The display 300 may display an image according to the second RGB values.

FIGS. 6A-D are graphs of histogram patterns for explaining the operations of a compensation circuit illustrated in FIG. 2, according to an example embodiment. The image data processing circuit 230B, via the control value generation circuit 235 outputs the control values PL_CTR to the compensation circuit 232 to equalize histogram patterns or to adjust at least one of the original image data (e.g., original RGB values).

Figure 6A:
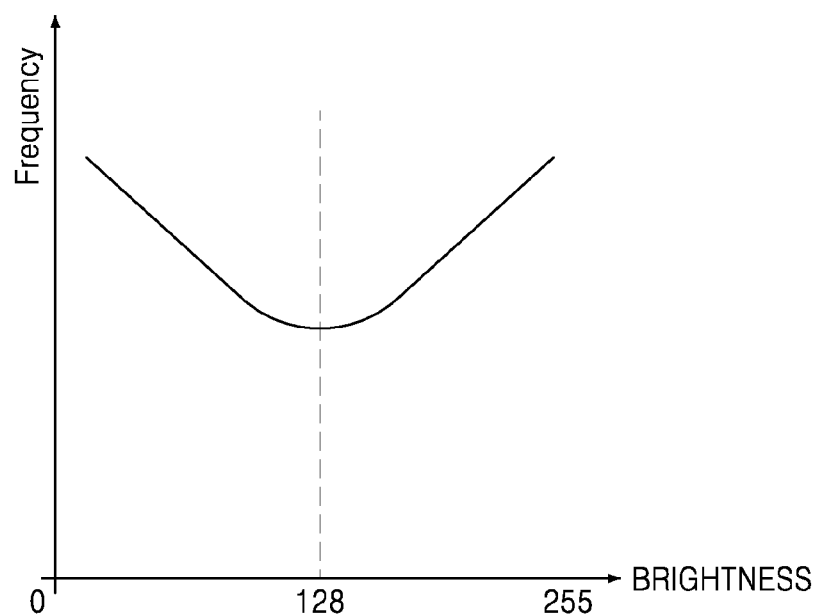
FIGS. 6A-D are graphs of histogram patterns for explaining the operations of a compensation circuit illustrated in FIG. 2, according to an example embodiment.
Figure 6B:
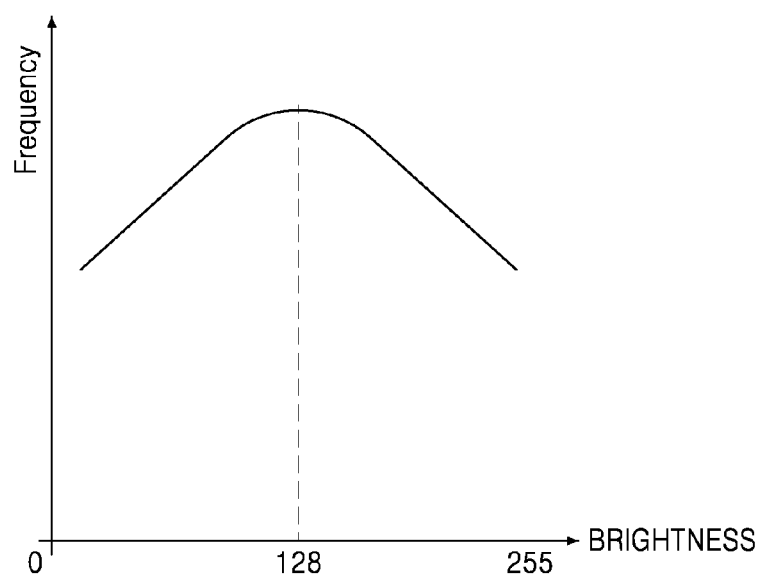
Figure 6C:
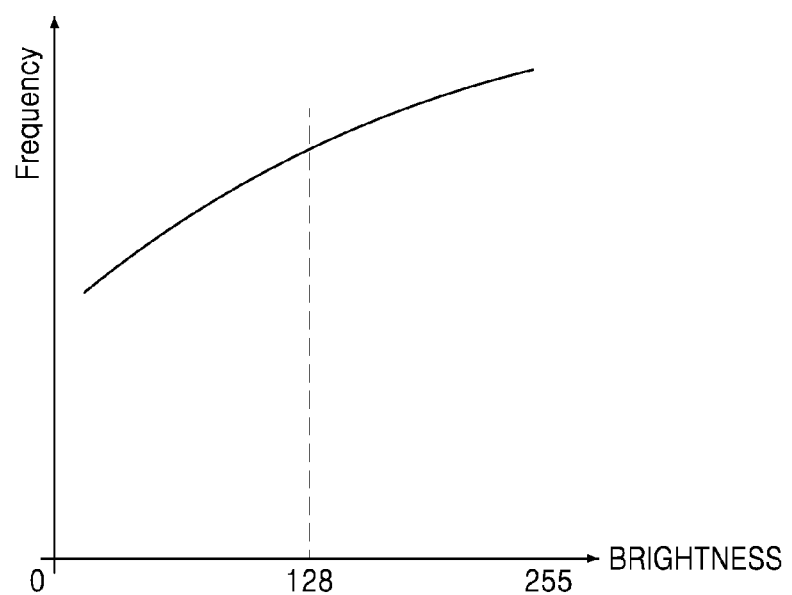
Figure 6D:
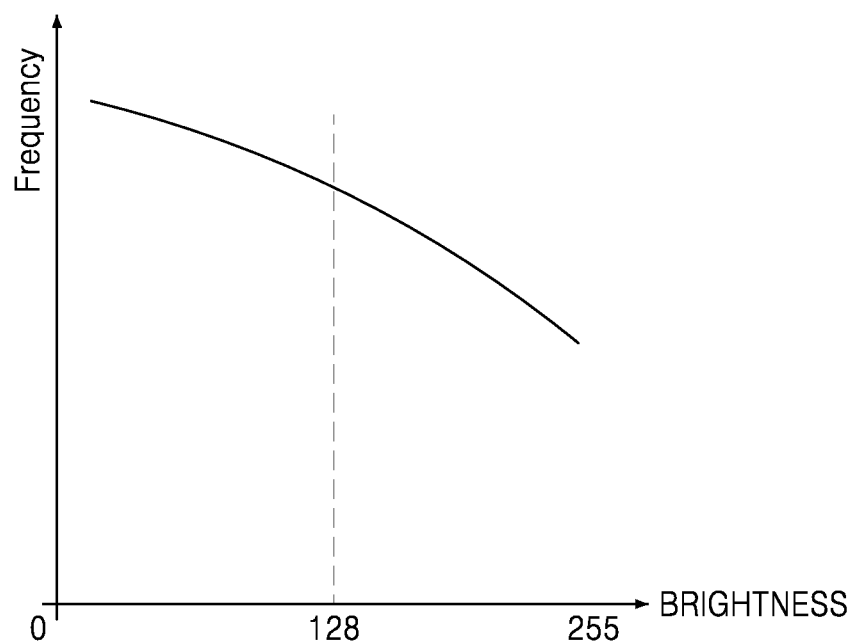

For instance, when the histogram pattern is like the graph illustrated in FIG. 4A, the control value generation circuit 235 outputs the control values PL_CTR corresponding to the graph illustrated in FIG. 6A to the compensation circuit 232. When the histogram pattern is like the graph illustrated in FIG. 4B, the control value generation circuit 235 outputs the control values PL_CTR corresponding to the graph illustrated in FIG. 6B to the compensation circuit 232. When the histogram pattern is like the graph illustrated in FIG. 4C, the control value generation circuit 235 outputs the control values PL_CTR corresponding to the graph illustrated in FIG. 6C to the compensation circuit 232. When the histogram pattern is like the graph illustrated in FIG. 4D, the control value generation circuit 235 outputs the control values PL_CTR corresponding to the graph illustrated in FIG. 6D to the compensation circuit 232.

The compensation circuit 232 adjusts at least one of the original RGB values based on the control values PL_CTR output from the control value generation circuit 235 and generates first image data, e.g., first RGB values, according to an adjustment result.

Figure 7:
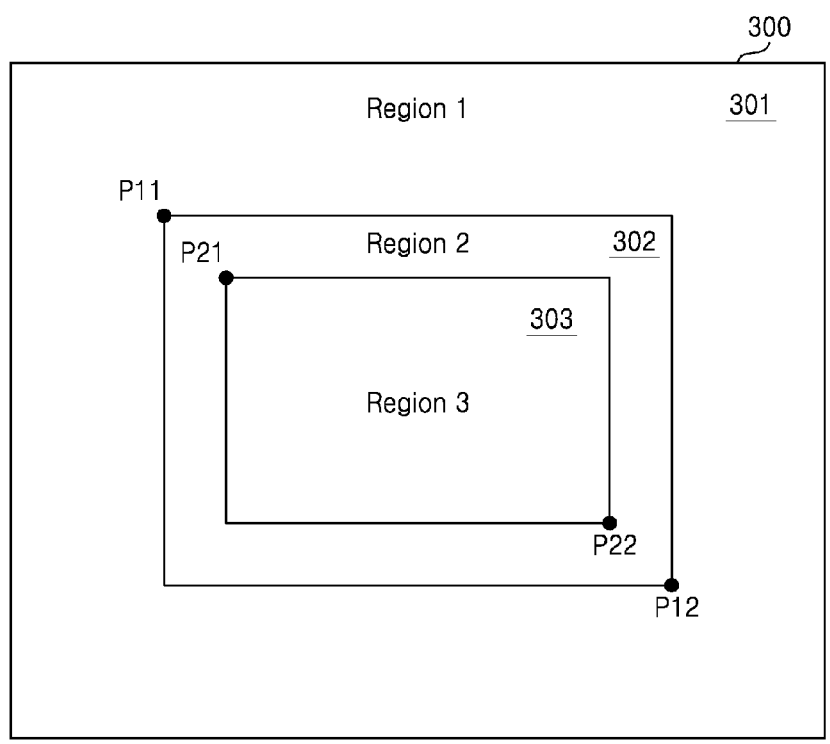
FIG. 7 is a conceptual diagram for explaining a method of adjusting a luminance value and a chroma value for a plurality of regions in the image data display of FIG. 1 and FIG. 3, according to an example embodiment.

FIG. 7 is a conceptual diagram for explaining a method of adjusting a luminance value and a chroma value for a plurality of regions in the image data display of FIG. 1 and FIG. 3, according to an example embodiment. As shown in FIG. 7, an image displayed on the display 300 may include a plurality of regions 301, 302, and 303.

When the first region 301 is a background region, the second region 302 is a UI region or a GUI region, and the third region 303 is a video playback region, the image data processing circuit 230A or 230B may independently or exclusively adjust luminance values and chroma values for each of the regions 301, 302, and 303 based on position information (e.g., P11 and P12 and/or P21 and P22) defining each region 301, 302, or 303.

The position information may be obtained from synchronization signals, e.g., a vertical synchronization signal and a horizontal synchronization signal, transmitted from the display controller 215 to the image data processing circuit 230A or 230B.

The position (or position information) of each of the regions 301, 302, and 303 displayed on the display 300 may be changed depending on a type of a current application program, e.g., a current media player. Therefore, the position information of the regions 301, 302, and 303 may be generated by the current application program.

Accordingly, the image data processing circuit 230A or 203B, via the adjustment circuit 236A or 236B may adjust luminance values and chroma values for each of the regions 301, 302, and 303 based on the control values YV_CTR and CH_CTR for each region 301, 302, or 303. For instance, the adjustment circuit 236A or 236B may adjust luminance values and chroma values for the second region 302 differently from luminance values and chroma values for the third region 303.

As described above with reference to FIGS. 1 through 7, the adjustment circuit 236A or 236B may adjust luminance values and chroma values with respect to an entire frame or each of a plurality of regions included in the entire frame.

Variations of the example embodiments are not to be regarded as a departure from the spirit and scope of the example embodiments, and all such variations as would be apparent to one skilled in the art are intended to be included within the scope of this disclosure.

What is claimed is:

1. A method of operating an image data processing circuit which controls a power consumption of an organic light-emitting diode (OLED) display, the method comprising:
    transforming at least one first Red, Green, Blue (RGB) value into at least one luminance value and at least one chroma value;
    generating at least a first control value to reduce the power consumption of the OLED display based on at least one of an input control value set by a user for power saving, a histogram associated with the at least one first RGB value and a type of an application executed to process the at least one first RGB value;
    adjusting the at least one luminance value and the at least one chroma value based on the generated first control value;
    generating at least one second RGB value based on the at least one adjusted luminance value and the at least one adjusted chroma value; and
    outputting the at least one second RGB value to the OLED display.

2. The method of claim 1, wherein the generating the first control value based on the histogram includes,
    analyzing a histogram pattern defined by a cumulative distribution of the at least one first RGB value, and
    generating the at least one first control value based on the analyzing.

3. The method of claim 1, wherein the generating the first control value based on the type of the application includes,
    detecting the type of the application as one of a video playback application program, a still-image application program, a game application program and a user interface application program executed to process the at least one first RGB value; and
    generating the first control value based on the detecting.

4. The method of claim 1, wherein the generating the first control value includes,
    defining a plurality of display regions in the OLED display, and
    generating a corresponding first control value for a respective one of the defined plurality of display regions, wherein
    the method further comprises independently controlling at least one luminance value and at least one chroma value for each of the defined plurality of display regions based on the corresponding first control value.

5. The method of claim 1, further comprising:
    adjusting at least one original RGB value based on at least a second control value; and
    generating the at least one first RGB value based on the at least one adjusted original RGB value.

6. The method of claim 5, further comprising:
    generating the second control value according to input control values set by a user.

7. The method of claim 5, further comprising:
    generating the second control value based on the histogram.

8. The method of claim 5, further comprising:
    detecting the type of the application as one of a video playback application program, a still-image application program, a game application program and a user interface application program executed to process the at least one original RGB value; and
    generating the first control value and the second control value based on the detected type of the application program.

9. The method of claim 5, wherein the generating the first control value includes,
    defining a plurality of display regions in the OLED display, and
    generating a corresponding first control value for a respective one of the plurality of display regions, wherein
    the method further comprises independently controlling at least one luminance value and at least one chroma value for each of the plurality of display regions based on the corresponding first control value.

10. The method of claim 9, wherein the position information is generated by an application program executed to process the at least one original RGB value.

11. A system on chip (SoC) for reducing power consumption of an organic light-emitting diode (OLED) display, the SoC comprising:
    a memory configured to store computer-readable instructions; and
    a processor configured to execute the computer-readable instructions to,
        transform at least one first Red, Green, Blue (RGB) value into at least one luminance value and at least one chroma value,
        generate at least a first control value to reduce the power consumption of the OLED display based on at least one of an input control value set by a user, a histogram associated with the at least one first RGB value and a type of an application executed to process the at least one first RGB value, adjust the at least one luminance value and the at least one chroma value based on the generated first control value,
generate at least one second RGB value based on the at least one adjusted luminance value and the at least one adjusted chroma value, and
output the at least one second RGB value to the OLED display such that the OLED display reduces the power consumption with the at least one second RGB value compared with the at least one RGB value.

12. The SoC of claim 11, wherein the processor is further configured to implement the computer readable instructions to,
adjust at least one of original RGB values based on at least one a second control value, and
generate the at least one first RGB value according to the adjusting of the at least one of original RGB values.

13. The SoC of claim 11, further comprising:
a register; and
a user interface configured to receive the input control value from the user; wherein the processor is further configured to execute the computer-readable instructions to,
generate a second control value based on the input control value, and
store first control value and the second control value in the register.

14. The SoC of claim 11, further comprising:
a register, wherein the processor is further configured to execute the computer-readable instructions to,
detect the type of the application as one of a video playback application program, a still-image application program, a game application program and a user interface application program executed to process the at least one original RGB value,
generate the first control value and a second control value based on the detected type of the application program, and
store the first control value and the at least one second control value in the register.

15. The SoC of claim 11, wherein the processor is further configured to generate the first control value and a second control value based on the histogram by,
analyzing a histogram pattern defined by a cumulative distribution of the at least one original RGB value; and
generating the first control value and the second control value based on the analyzed histogram pattern.

16. A method of operating an image data processing circuit which controls an operation of an organic light-emitting diode (OLED) display, the method comprising:
transforming image data into at least one luminance value and at least one chroma value;
adjusting the at least one luminance value and the at least one chroma value to reduce power consumption of the OLED display based on at least one first control value, the at least one first control value being based on at least one of an input control value set by a user, a histogram associated with the image data and a type of an application executed to process the image data;
generating output image data based on the at least one adjusted luminance value and the at least one adjusted chroma value; and
outputting the output image data to the OLED display.

17. The method of claim 16, wherein the image data is at least one original Red, Green, Blue (RGB) value associated with data received from an external memory.

18. The method of claim 17, wherein the transforming comprises:
receiving the at least one original RGB value;
generating at least one second control value based on the input control value set by the user; and
generating at least one first RGB value based on the at least one received original RGB value and the at least one second control value.

19. The method of claim 18, further comprising:
generating the at least one first control value based on at least one of,
analyzing a histogram pattern defined by a cumulative distribution of the at least one first RGB value, and
detecting the type of the application program executed to process the at least one first RGB value.

* * * * *